United States Patent
Kim

(10) Patent No.: US 7,305,210 B2
(45) Date of Patent: Dec. 4, 2007

(54) BROADCAST SERVICE METHOD OF MOBILE COMMUNICATION SYSTEM THAT SELECTS A CHANNEL

(75) Inventor: Hyoung-Rok Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 727 days.

(21) Appl. No.: 10/713,273

(22) Filed: Nov. 17, 2003

(65) Prior Publication Data

US 2004/0097239 A1    May 20, 2004

(30) Foreign Application Priority Data

Nov. 18, 2002    (KR)    ............... 10-2002-0071739

(51) Int. Cl.
*H04H 7/00* (2006.01)
*H04B 7/00* (2006.01)
*H04Q 7/20* (2006.01)

(52) U.S. Cl. .................. 455/3.06; 455/66.1; 455/434

(58) Field of Classification Search ............. 455/3.03, 455/434, 517, 3.06, 343; 370/390, 469, 320
See application file for complete search history.

(56) References Cited

U.S. PATENT DOCUMENTS

| | | | |
|---|---|---|---|
| 6,363,058 B1 | 3/2002 | Roobol et al. ............ 370/310 |
| 6,684,081 B2 * | 1/2004 | Sarkkinen et al. ......... 455/515 |
| 6,874,113 B2 * | 3/2005 | Chao et al. ............... 714/748 |
| 2002/0057662 A1 * | 5/2002 | Lim ......................... 370/338 |
| 2003/0007517 A1 * | 1/2003 | Beckmann et al. ......... 370/537 |
| 2003/0035423 A1 * | 2/2003 | Beckmann et al. ......... 370/390 |

FOREIGN PATENT DOCUMENTS

| | | |
|---|---|---|
| JP | 2002026991 | 5/2001 |
| KR | 1019990084445 | 12/1999 |
| KR | 1020010008734 | 2/2001 |
| KR | 1020010062995 | 9/2001 |
| KR | 1020020002074 | 1/2002 |
| KR | 1020020053403 | 7/2002 |

OTHER PUBLICATIONS

Chinese Office Action from the Patent Office Of The People's Republic Of China, application No. 2003101183088, Broadcast Service Method of Mobile Communication System, dated Jan. 28, 2005.

* cited by examiner

*Primary Examiner*—Tilahun Gesesse
(74) *Attorney, Agent, or Firm*—Ked & Associates, LLP

(57) ABSTRACT

A technique for transmitting the same moving picture (video) to a plurality of terminals suitable for presenting a moving picture (video) performance by using a mobile communication terminal in an open area such as an athletic field. The method includes a first step in which a UMTS (Universal Mobile Telecommunications System) system removes headers added in a BMC SDU (Broadcast/Multicast Control Service Data Unit) and transmits it to a terminal. A second step is performed in the terminal and involves checking input of a broadcast service key signal by a user and reads an SIB (System Information Block) transmitted from a base station, modular-calculates an IMSI (International Mobile Subscriber Identity) value and selects a corresponding S-CCPCH (Secondary Common Control Physical Channel). In a third step, an RRC (Radio Resource Control) of the terminal reads a CTCH (Common Traffic Control) indicator, configures lower layers (CTCH, FACH (Fast Access Channel) and S-CCPCH), and reads all the data received without using a DRX (Discontinuous Receive) method.

33 Claims, 6 Drawing Sheets

| FA | S-CCPCH INDEX | Number of 64 kbps S-CCPCHs mapped onto CTCH |
|----|---------------|---------------------------------------------|
| 1  | #1~#13        | 13                                          |
| 2  | #14~#25       | 12                                          |
| 3  | #26~#38       | 13                                          |
| 4  | #39~#50       | 12                                          |

BROADCAST SERVICE METHOD OF MOBILE COMMUNICATION SYSTEM THAT SELECTS A CHANNEL

BACKGROUND OF THE INVENTION

1. Field of the Invention

The present invention generally relates to transmitting images in a communication system, and more particularly to a system and method for transmitting moving picture (video) information in a mobile communication system.

2. Background of the Related Art

FIG. 1 shows an example of how a moving picture (video) performance may be displayed on a plurality of (e.g., two hundred (200)) TFT-LCDs (Thin Film Transistor-Liquid Crystal Display) set up at stadium, athletic field, or other areas having many spectators by using a broadcast service of a mobile communication system. As shown, the content of the moving picture (video) is divided and displayed on four large display screens, each large screen comprised of fifty (50) smaller display screens. Moving picture data is transmitted to the 200 TFT-LCDs (each having a terminal installed therein) when a performance is started, and dynamic pictures are displayed on the four large display screens. At this time, one TFT-LCD is allocated per performer. Namely, each TFT-LCD can display video images of a different person.

FIG. 2 illustrates a BMC protocol of a UMTS system for providing a broadcast service such as that of FIG. 1 in accordance with the related art. In this protocol, besides a MAC (Medium Access Control) header and an RLC (Radio Link Control) header, a BMC header is also added.

However, in the case of implementing the broadcast service by using the BMC layer, because the BMC protocol includes the BMC header in addition to the MAC header and the RLC header, and since the BMC PDU (Protocol Data Unit) consists of several fields, a user data rate is undesirably degraded. Thus, there has been difficulty in presenting a moving picture (video) performance to spectators in a large area, such as an athletic field by using a base station (Node B) and a terminal due to the above-described problems.

SUMMARY OF THE INVENTION

An object of the invention is to solve at least the above problems and/or disadvantages and to provide at least the advantages described hereinafter.

Another object of the present invention is to improve or maintain a user data rate in a video presentation system.

Another object of the present invention is to provide a broadcast service method and apparatus of a mobile communication system for suitably setting a CRLC channel, a CMAC channel, a CPHY channel and a channel so as to enhance a user data rate when transmitting moving picture (video) data for a moving picture (video) performance by using a BMC layer of a UMTS system.

To achieve at least the above objects there is provided a new broadcast service method of a mobile communication system as follows. A first step in which UTRAN (UMTS Terrestrial Radio Access Network) removes headers added in a BMC SDU (Service Data Unit) and transmits it to a terminal A second step in which the terminal checks the input of a broadcast service key signal by a user, reads an SIB (System Information Block) transmitted from a base station (Node B) of UTRAN, modular-calculates an IMSI (International Mobile Subscriber Identity) value and selects a corresponding S-CCPCH (Secondary Common Control Physical Channel). Finally, a third step in which an RRC (Radio Resource Control) of the terminal reads a CTCH (Common Traffic Channel) indicator, configures lower layers (CTCH, FACH (Fast Access Channel), and S-CCPCH), and reads all the received data.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 7:
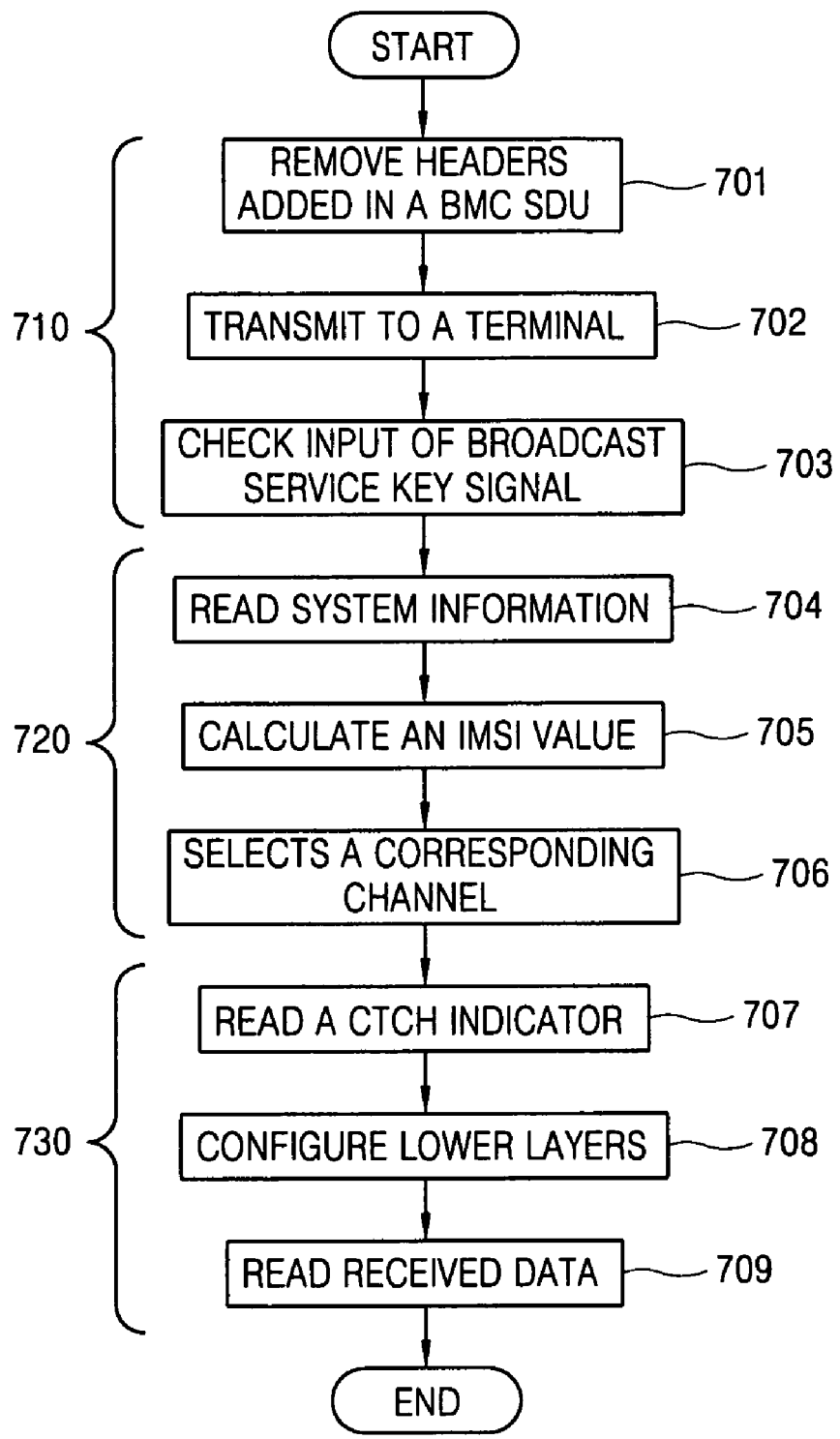
FIG. 7 is a flow chart showing a process according to an embodiment of the present invention.

A preferred embodiment of a broadcast service method of a mobile communication system as shown in FIG. 7 includes a first step 710 in which UTRAN (UMTS Terrestrial Radio Access Network) removes headers added in a BMC SDU (Service Data Unit) 701 and transmits it to a terminal 702. A second step 720 in which the terminal checks the input of a broadcast service key signal by a user 703, reads an SIB (System Information Block) transmitted from a base station (Node B) of UTRAN 704, modular-calculates an IMSI (International Mobile Subscriber Identity) value 705 and selects a corresponding S-CCPCH (Secondary Common Control Physical Channel) 706. Lastly, a third step 730 in which an RRC (Radio Resource Control) of the terminal reads a CTCH (Common Traffic Channel) indicator 707, configures lower layers (CTCH, FACH (Fast Access Channel) 708, and S-CCPCH), and reads all the received data 709.

The broadcast service method of a mobile communication system in accordance with one embodiment of the present invention will now be explained with reference to FIGS. 3, 4, 5 and 6.

Figure 2:
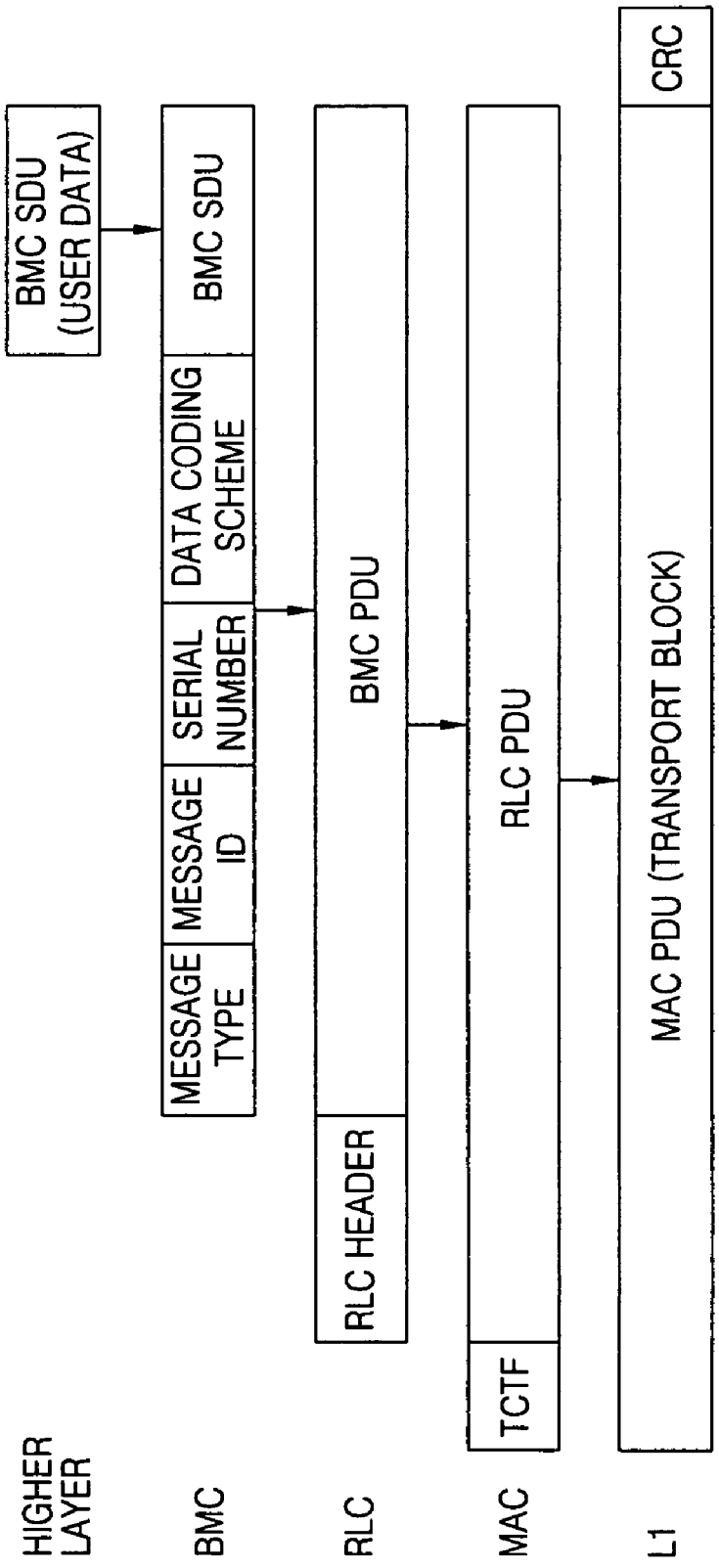
FIG. 2 illustrates a format of a BMC protocol in a UMTS system.
Figure 3:
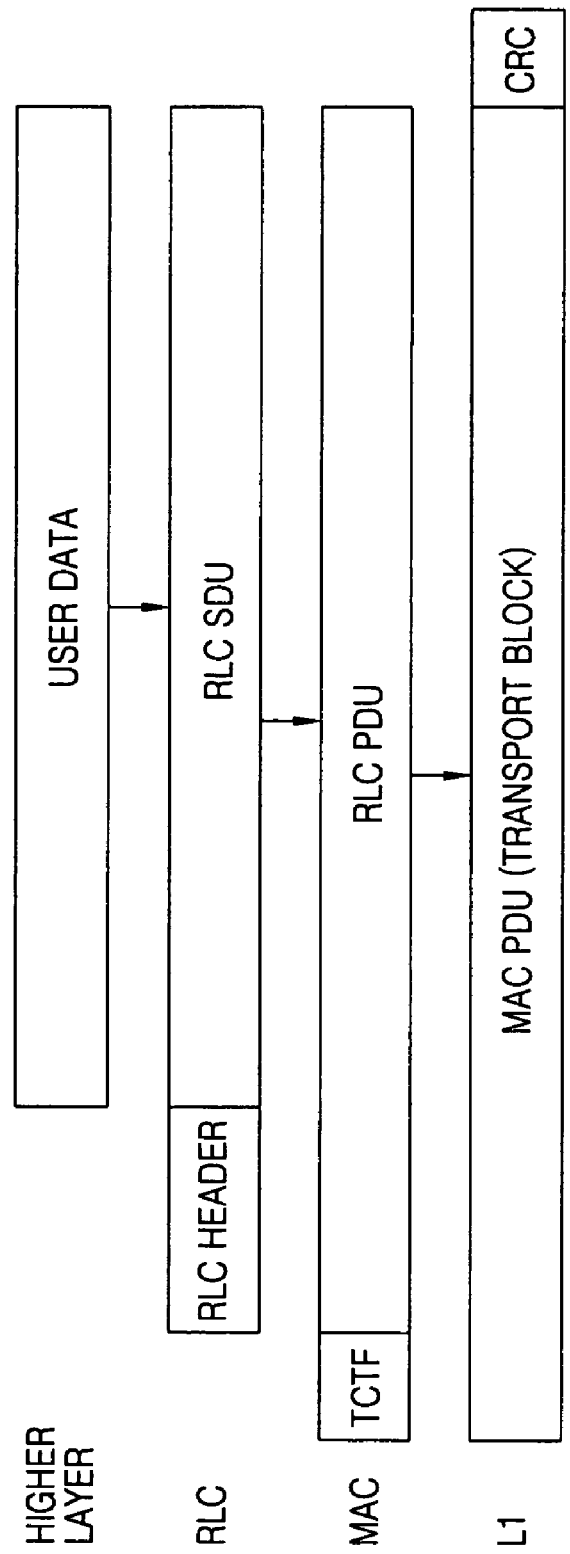
FIG. 3 illustrates a format of a BMC protocol in accordance with the present invention.

FIG. 3 illustrates a preferred format of a BMC protocol in accordance with the present invention. Compared to the information shown in FIG. 2, it can be seen that many headers have been removed. That is, for the user data received from the upper (higher) layer of the UTRAN, no header is added at the BMC layer, and the RLC can directly add the RLC header to the user data to constitute the RLC PDU.

Figure 4:
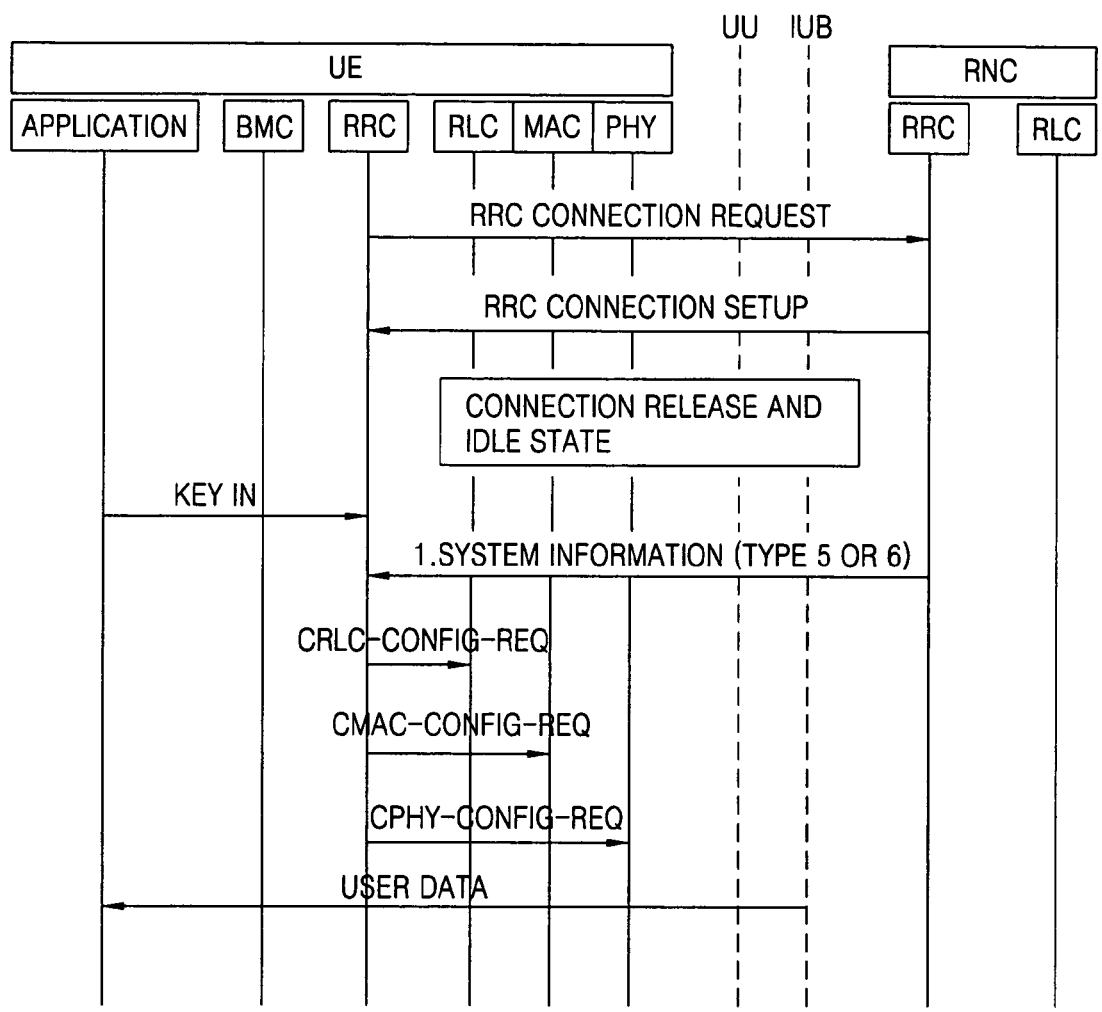
FIG. 4 is a signal flow chart for defining parameters between the UTRAN and a terminal in accordance with the present invention.

In order to do so, several parameters should be defined between the UTRAN and a terminal (UE) as shown in FIG. 4. Each terminal (UE) performs an attachment function in the mobile communication network, and a user can enter a keystroke for a broadcast service of the terminal (UE).

The base station (Node B) transmits an N number of S-CCPCH lists per FA (Frequency Allocation) by SIB to the terminal (UE) that is in an idle state. Then, the terminal (UE) reads the SIB, modular-calculates an IMSI value (i.e., calculates an IMSI value using modular arithmetic) and selects a corresponding S-CCPCH. For the SIB, either SIB5 (System Information Block 5) or SIB6 (System Information Block 6) can be used.

Thereafter, the RRC of the terminal (UE) reads a CTCH indicator and configures lower layers (CTCH, FACH (Forward Access Channel) and S-CCPCH).

The UTRAN maps the CTCH, FACH and S-CCPCH and transmits to the terminal (UE). Then, the terminal (UE) reads all received data, and in this case, the terminal reads the received data without using a DRX (Discontinuous Reception) method. Also, an MBMS (Multimedia Broadcast/Multicast service) server and the terminal (UE) should respectively know the type of video codec that the other end is using.

Figures 5, 6:
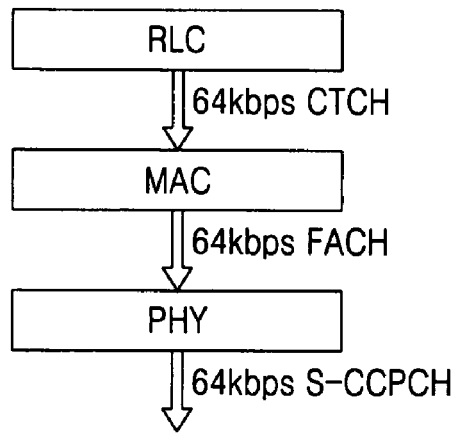
FIG. 5 is an explanatory view of a channel configuration in accordance with the present invention.
FIG. 6 is a table showing the number of S-CCPCH transmitting CTCH per FA.

FIG. 5 is an explanatory view of a channel configuration in accordance with the present invention, in which it is assumed that broadcast image (video) data employs 64 kbps, with 50 groups of content data, 12~13 S-CCPCHs available per FA, and 4 terminals simultaneously receiving each content data. In this case, the CTCH can be set to operate at 64 kbps.

The FACH can also be set to operate at 64 kbps. The CTCH and FACH are mapped to each other in a one-to-one manner, and a different logical channel is not mapped to the FACH to which the CTCH is mapped.

Furthermore, the S-CCPCH can also be set to operate at 64 kbps. The FACH and the S-CCPCH are one-to-one mapped, and a PCH (Physical Channel) is not mapped to the S-CCPCH to which the FACH is mapped.

Figure 1:
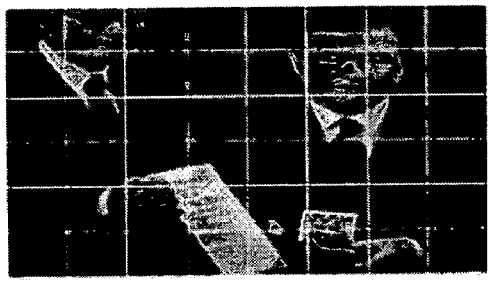
FIG. 1 illustrates an example of presenting a moving picture performance which is displayed on TFT-LCDs by using a broadcast service of a mobile communication system.
Figure 1:
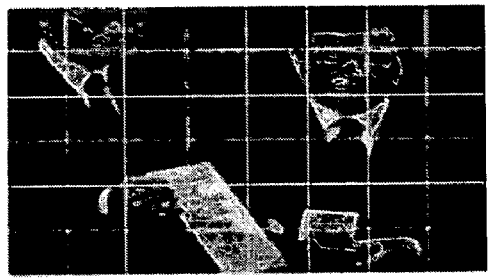
Figure 1:
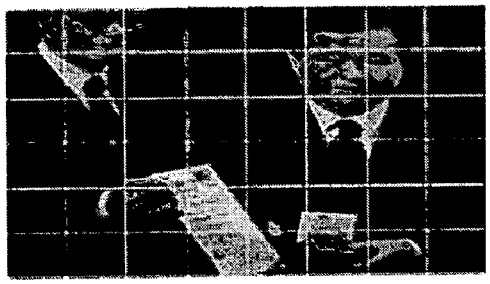
Figure 1:
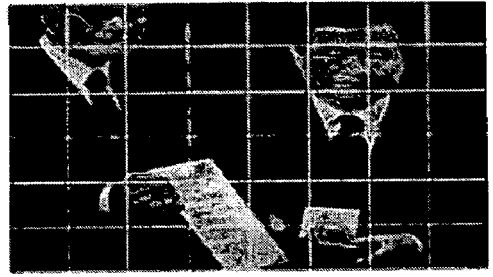

When accommodating 50 groups of data at 64 kbps, in order to present a moving picture (video) performance as shown in FIG. 1, fifty 64 kbps S-CCPCHs should be set.

FIG. 6 is a table showing the number of S-CCPCHs transmitting CTCH per FA.

A channel select method of the terminal (UE) among 12~13 S-CCPCHs per FA can be expressed by the mathematical formula (1) below:

$$\text{Index of selected } S\text{-}CCPCH = IMSI \bmod K \quad (1)$$

First, the 192 terminals are divided into four groups, and a PSC (Preliminary Scramble Code) can be set in each terminal in advance, so that one base station is selected per group.

The number of S-CCPCHs that each base station (Node B) may have is as shown in FIG. 6, and a channel select method of the terminal (UE) among the 12~13 S-CCPCHs can be expressed by the mathematical formula (1).

In the mathematical formula (1), the IMSI value is adjusted so that a calculation value of IMSI mod K can be the same for four terminals. Thus, since four terminals select the same S-CCPCHs, the same image can be displayed by each of the four terminals.

In addition, if the IMSI value is adjusted so that a calculation value of IMSI mod K can be the same for an N number of terminals, an N number of same images can be displayed by each of the N number of terminals. Accordingly, the number of terminals on which the same images are displayed can be increased regardless of capacity of the mobile communication system capacity.

As so far described, the broadcast service method of a mobile communication system of the present invention has the following advantages. In the BMC protocol of the UMTS system, the headers added to the BMC SDU are removed, and several parameters can be pre-defined between the server and the terminal. Therefore, when moving picture (video) data is transmitted for displaying a moving picture (video) performance, a user data rate can be improved.

In addition, by appropriately adjusting the IMSI value, the number of terminals having the same data contents can be advantageously increased without additionally increasing the number of base stations (node Bs).

The foregoing embodiments and advantages are merely exemplary and are not to be construed as limiting the present invention. The present teachings can be readily applied to other types of apparatuses and methods. The description of the present invention is intended to be illustrative, and not to limit the scope of the claims. Many alternatives, modifications, and variations will be apparent to those skilled in the art.

What is claimed is:

1. A broadcast service method of a mobile communication system comprising:

forming an SDU (Service Data Unit) without adding a header in a BMC (Broadcast/Multicast Control) layer;

transmitting the SDU to a terminal, the transmitted SDU including a list of a plurality of channels;

checking an input of a broadcast service key signal by a user and reading system information transmitted from a base station (Node B), calculating an IMSI (International Mobile Subscriber Identity) value and selecting a corresponding channel from the list of the plurality of channels based on the calculated IMSI value; and reading a CTCH (Common Traffic Channel) indicator, configuring lower layers, and reading data received in the terminal, said reading the CTCH indicator being performed by an RRC (Radio Resource Control) of the terminal.

2. The method of claim 1, wherein the system information is transmitted by an SIB5(System Information Block 5) or an SIB6 (System Information Block 6) of the terminal.

3. The method of claim 1, wherein calculating the IMSI value includes modular-calculating the IMSI.

4. The method of claim 1, wherein the channel selected based on the calculated IMSI value is a S-CCPCH (Secondary Common Control Physical Channel).

5. The method of claim 1, wherein selecting corresponding channel based on the calculated IMSI value is performed to obtain an index of a secondary common control physical channel (S-CCPCH) that each terminal of a plurality of terminals may have, and the terminals are divided into N number of groups.

6. The method of claim 5, wherein each terminal of the N number of groups selects a channel by setting the index of selected S-CCPCH to be equal to IMSI mod K, wherein ISMI is an international mobile subscriber identity value, mod is the modular operator, and K is the number of S-CCPCHs mapped to CTCHs.

7. The method of claim 1, wherein the lower layers comprise at least one of a CTCH, a fast access channel (FACH) and a S-CCPCH.

8. The method of claim 7, wherein the CTCH and the FACH are one-to-one mapped to each other, and a different logical channel is not mapped to the FACH to which the CTCH is mapped.

9. The method of claim 7, wherein the FACH and the S-CCPCH are one-to-one mapped to each other, and a PCH (Physical Channel) is not mapped to the S-CCPCH to which the FACH is mapped.

10. The method of claim 1, wherein the reading the received data is performed without using a DRX (Discontinuous Reception) method.

11. A method for providing a broadcast service in a communication system, comprising:
forming a service data unit by attaching a radio link control header to user data;
transmitting the service data unit to at least one terminal without attaching a header in a broadcast/multicast control layer;
reading system information transmitted from a base station;
calculating an international mobile subscriber identity value; and
selecting a corresponding channel based on the calculated international mobile subscriber identity value.

12. The method of claim 11, further comprising:
checking an input of a broadcast service key signal.

13. The method of claim 11, further comprising:
reading a common traffic channel indicator;
configuring lower layer channels; and
reading data received in the terminal, said reading the common traffic channel indicator being performed by a radio resource control of the terminal.

14. The method of claim 13, wherein the lower layer channels comprise at least one of a common traffic channel, a fast access channel, and a secondary common control physical channel.

15. The method of claim 14, wherein the common traffic channel and the fast access channel are one-to-one mapped to each other, and a different logical channel is not mapped to the fast access channel to which the common traffic channel is mapped.

16. The method of claim 14, wherein the fast access channel and the secondary common control physical channel are one-to-one mapped to each other, and a physical channel is not mapped to the secondary common control physical channel to which the fast access channel is mapped.

17. The method of claim 13, wherein reading said received data in the terminal is performed without using a discontinuous reception method.

18. The method of claim 11, wherein the system information is transmitted by a system information block 5 (SIB5) or an system information block 6 (SIB6) of the terminal.

19. The method of claim 11, wherein calculating the international mobile subscriber identity value includes modular-calculating the international mobile subscriber identity value.

20. The method of claim 11, wherein the channel selected based on the calculated international mobile subscriber identity value is a secondary common control physical channel (S-CCPCH).

21. The method of claim 11, wherein selecting the corresponding channel includes obtaining an index of a secondary common control physical channel that each terminal of a plurality of terminals may have, said plurality of terminals divided into N groups.

22. The method of claim 21, wherein each terminal of the N groups selects a channel by setting the index of the selected secondary common control physical channel to be equal to:
(international mobile subscriber identity) mod K
where mod is the modular operator and K is the number of selected secondary common control physical channels mapped to common traffic channels.

23. The method of claim 11, wherein the lower layer channels comprise at least one of a common traffic channel, a fast access channel, and a secondary common control physical channel.

24. A broadcast service method of a mobile communication system, comprising:
forming a service data unit;
transmitting said service data unit to a terminal;
checking an input of a broadcast service key signal of a user;
reading system information transmitted from a base station;
calculating an international mobile subscriber identity value and selecting a corresponding channel based on the calculated international mobile subscriber identity value;
reading a common traffic channel indicator;
configuring lower layer channels; and
reading all of the data received in said terminal.

25. The method of claim 24, wherein the system information is transmitted by a system information block 5 (SIB5) or a system information block 6 (SIB6) of said terminal.

26. The method of claim 24, wherein calculating the international mobile subscriber identity value includes modular-calculating the international mobile subscriber identity.

27. The method of claim 24, wherein said selected channel is a secondary common control physical channel.

28. The method of claim 24, wherein the selecting is performed to obtain an index of a secondary common control physical channel that each terminal of a plurality of terminals may have, said plurality of terminals divided into N groups.

29. The method of claim 28, wherein each terminal of the N groups selects a channel by setting the index of the selected secondary common control physical channel to be equal to;
(international mobile subscriber identity) mod K
where mod is the modular operator and K is the number of selected secondary common control physical channels mapped to common traffic channels.

30. The method of claim 24, wherein said lower layer channels comprise at least one of a common traffic channel, a fast access channel, and a secondary common control physical channel.

31. The method of claim 30, wherein the common traffic channel and the fast access channel are one-to-one mapped to each other, and a different logical channel is not mapped to the fast access channel to which the common traffic channel is mapped.

32. The method of claim 30, wherein the fast access channel and the secondary common control physical channel are one-to-one mapped to each other, and a physical channel is not mapped to the secondary common control physical channel to which the fast access channel is mapped.

33. The method of claim 24, wherein said reading all of the data does not use a discontinuous reception method.

* * * * *